United States Patent
Williams

(10) Patent No.: US 6,533,557 B1
(45) Date of Patent: Mar. 18, 2003

(54) POSITIVE DISPLACEMENT PUMP

(76) Inventor: David G. Williams, 1203 Turncreek, Katy, TX (US) 77450

( * ) Notice: Subject to any disclaimer, the term of this patent is extended or adjusted under 35 U.S.C. 154(b) by 17 days.

(21) Appl. No.: 09/928,781

(22) Filed: Aug. 13, 2001

Related U.S. Application Data

(60) Provisional application No. 60/224,921, filed on Aug. 11, 2000.

(51) Int. Cl.$^7$ .......................... F04B 17/00; F04B 35/00
(52) U.S. Cl. ........................................ 417/405; 137/262
(58) Field of Search ................... 417/375, 206, 417/405, 348, 391, 390; 137/262, 99; 123/43 R; 239/404

(56) References Cited

U.S. PATENT DOCUMENTS

| | | | | |
|---|---|---|---|---|
| 3,910,728 A | * | 10/1975 | Sloan | 417/390 |
| 4,260,110 A | * | 4/1981 | Werding | 239/404 |
| 4,541,450 A | * | 9/1985 | Bron | 137/99 |
| 4,820,135 A | * | 4/1989 | Simmons | 417/391 |
| 4,859,157 A | * | 8/1989 | Adler | 417/348 |
| 5,143,333 A | * | 9/1992 | Smith | 415/405 |
| 5,178,515 A | * | 1/1993 | Tsuchiya et al. | 415/206 |
| 5,320,500 A | * | 6/1994 | Cholet | 417/375 |
| 5,333,640 A | * | 8/1994 | Swift et al. | 137/262 |
| 5,375,987 A | * | 12/1994 | Brent | 418/227 |
| 6,343,575 B1 | * | 2/2002 | Deckard | 123/43 R |

* cited by examiner

*Primary Examiner*—Teresa Walberg
*Assistant Examiner*—Leonid Fastovsky
(74) *Attorney, Agent, or Firm*—Shook, Hardy & Bacon L.L.P.

(57) ABSTRACT

This invention relates to a positive displacement pump which allows a liquid additive (such as liquid fertilizer) to be introduced into another liquid stream (such as water) and to be mixed in a constant proportion. One end of the pump can be connected to a faucet and the other end to a typical garden hose or other device. Water enters the pump through a faucet and is redirected (bent) by an upper stator which allows the water to rotate turbine vanes. The turbine is rotatably connected to a cam and the rotation of the cam moves pistons which allows liquid fertilizer to be drawn in from its reservoir. The liquid fertilizer flows through a tube and into one of two pistons. Then, the liquid fertilizer is dispelled through one of the exit tubes through the pumping action of the pistons. The water which was used to turn the turbine then combines with the liquid fertilizer as it comes out of the exit tubes and a water/fertilizer mixture is created.

4 Claims, 3 Drawing Sheets

POSITIVE DISPLACEMENT PUMP

CROSS-REFERENCE TO RELATED APPLICATIONS

Priority is claimed to U.S. provisional patent application Ser. No. 60/224,921 filed Aug. 11, 2000.

STATEMENT REGARDING FEDERALLY SPONSORED RESEARCH

Not applicable.

BACKGROUND OF THE INVENTION

1. Field of the Invention

This invention relates to a positive displacement pump which allows a liquid additive to be introduced into another liquid stream (such as water coming from a faucet) and mixes the liquids together in a constant proportion without the use of any external power source.

2. Description of the Related Art

The prior art in this field contains many methods for injecting fertilizer or the like into a water stream. Some of these devices utilize an external power source to inject fertilizer into a water supply. Other pumps rely on small pressure drops in the lines to inject fertilizer. These are often referred to as Venturi-type injectors. Unfortunately, such devices do not allow for exact dimensioning of liquid fertilizer into the water stream. Often, the liquid fertilizer additive is not kept in a constant proportion to the irrigation water flow through the supply line. Further, these devices cannot operate against back pressure which is created by a length of hose.

Other known systems for injecting liquid fertilizer into a pipe carrying irrigation water include systems consisting of an axial turbine impeller coaxially positioned in the pipe and a pump in the form of a helical rotor rotating within a flexible stator housing. A valve means is provided for controlling the fertilizer flow. The main drawback of this system is the low efficiency of the helical pump due to its enclosure in a flexible stator housing causing considerable friction losses.

Another known embodiment of a fertilizer injector comprises a tangential turbine and a pump mounted on a common shaft in a casing positioned outside an irrigation pipe. The turbine is driven by a measured flow of water drawn from the pipe and spilled into the open after having passed the turbine. The pump draws fertilizer out of a container and injects it into the pipe downstream of the port delivering water to the turbine. Two kinds are proposed as alternatives: (1) a spiral-type screw conveyor and (2) a centrifugal impeller. Both kinds of pumps are enclosed in a casing which communicates at its low-pressure side with a fertilizer container, and at its high-pressure side with the irrigation pipe. This system suffers from the drawback that the used water is spilled into the open, and that the pump-impeller is necessarily of low efficiency.

Another embodiment of a fertilizer injection system comprises an axial-flow turbine impeller coaxially positioned in the irrigation pipe, a gear pump positioned outside the pump on the mounting plate, and a gear train extending between turbine and gear pump. Again, as in the aforementioned systems, the pump injects liquid into the pipe carrying the irrigation water. The main drawback of this embodiment is the requirement of bevel gearing for transmission of power from turbine to pump, which is usually a source of trouble, especially as the gear is submerged in the water in the pipe and is not readily accessible.

There are also many other methods for injecting a liquid additive (not necessarily liquid fertilizer) to a water stream. One involves water passing through a pipe, turning a water wheel, and then flowing out to another pipe. The rotation of the water wheel through a shaft causes rotation of a soap wheel. When the soap wheel is rotated, soap passes down from the reservoir into the recess in the body and thus to the top of the soap wheel which receives soap between its teeth and carries the soap around in the recess in the body to a position in line with the pipe in which the water is discharged. As the water passes the periphery of the soap wheel, it picks up water and discharges it through the tube as suds.

Other devices consist of an axial turbine impeller rotatably positioned in housing. Liquid fertilizer is caused to enter the inlet through an inlet port in the housing, is pressurized by the movement of vanes along the channel and leaves the outlet end through an outlet port in the housing, from where it is conveyed to the irrigation pipe at a point downstream of the pump impeller.

Yet another device utilizes a pump with a main fluid chamber (water chamber) and an additive fluid chamber. In the main fluid chamber, a pair of multivaned impellers are rotatably mounted and inter-engaged intermediate the inlet and outlet. The additive fluid chamber is spaced from the main fluid chamber and has similarly mounted impellers which are axially aligned with the impellers of the main fluid chamber and secured rotatably by said main fluid chamber impellers. The outlet of this additive fluid chamber is connected in fluid communication with a diffuser in the main fluid chamber, said diffuser being positioned midway of said impellers in the main fluid chamber. The impellers of the additive fluid chamber are formed for passing fluid through said chamber of a determined, proportional volume less than the fluid passed through said main fluid chamber by the impellers thereof. Thus, additive fluid will be metered into the main fluid chamber for mixing with the main fluid flow in determined and exact proportion.

Finally, several devices for injecting solid fertilizer into a pipeline carrying water have been disclosed in the prior art. In these devices, a cover for a casing is usually removed and a certain amount of water-soluble material is added. Then, the casing is closed and the water supply is started. The water is directed onto the blades and the material inside the container is pressed against the inner surface of the peripheral wall as a result of the centrifugal or rotational force. Only completely dissolved material in the water can leave the interior of the container due to the centrifugal force pressing the undissolved material against the inner surface of the container's peripheral wall. Obviously, the main drawback of this device is the requirement that a solid fertilizer be loaded into the casing prior to each use.

SUMMARY OF THE INVENTION

The present invention has as its main objective the avoidance of the above-mentioned drawbacks.

It is a further object of the invention to provide a cheap and reliable pump which delivers a steady stream of water/fertilizer mixture (or other mixture of liquids) of a constant concentration.

Yet another object of the invention is to create a pump which will work against back pressure created by a length of hose attached to the end of the pump. This will allow the pump to be connected directly to a faucet rather than to the end of a garden hose. This also allows a liquid fertilizer reservoir to be placed next to the faucet rather than lugged to the middle of the lawn near the sprinkler during each use. Further, the present invention should be easily installed and capable of remaining on the faucet even when the faucet is being used to generate a pure water stream.

In general, the present invention involves a pump which can be connected to a faucet at its top end and connected to a typical garden hose or other device at its bottom end. Water enters the pump through a faucet and is redirected (bent) by vanes on a stator which allows the water to enter the turbine at an optimal angle to rotate the turbine impellers. The turbine is rotatably connected to a cam which allows the cam to move pistons. The movement of the pistons allows liquid fertilizer to be drawn from its reservoir when the valve connecting the liquid fertilizer reservoir to the pump is in an open position. The liquid fertilizer flows through an inlet tube into the piston and then into the exit tubes through the motion of the pistons. The liquid fertilizer combines with the water to create a water/fertilizer mixture which then flows through the hose to an attached sprinkler or other device.

It is important to note that although this invention is often discussed as a pump for mixing liquid fertilizer with water, it actually has many other potential uses. In reality, the present invention can be used to combine any liquid with a constant stream of any other liquid to form a uniform mixture.

DETAILED DESCRIPTION OF INVENTION

Figure 2:
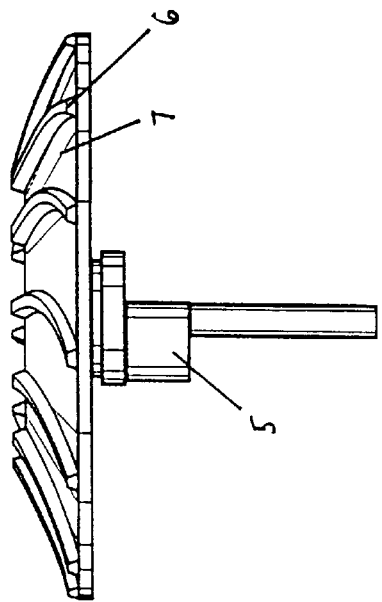
FIG. 2 is a front view of the turbine and cam of the present invention.
Figure 1:
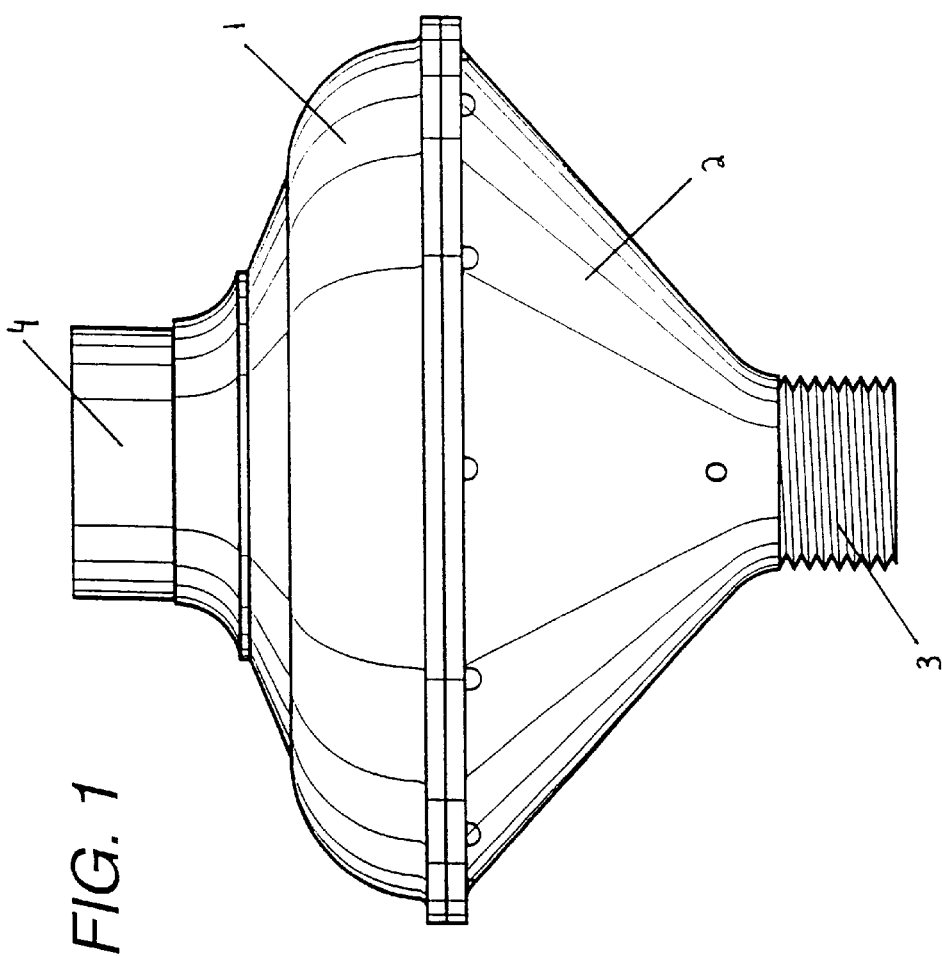
FIG. 1 is a front view of a fully assembled water driven positive displacement pump according to the present invention.
Figure 3:
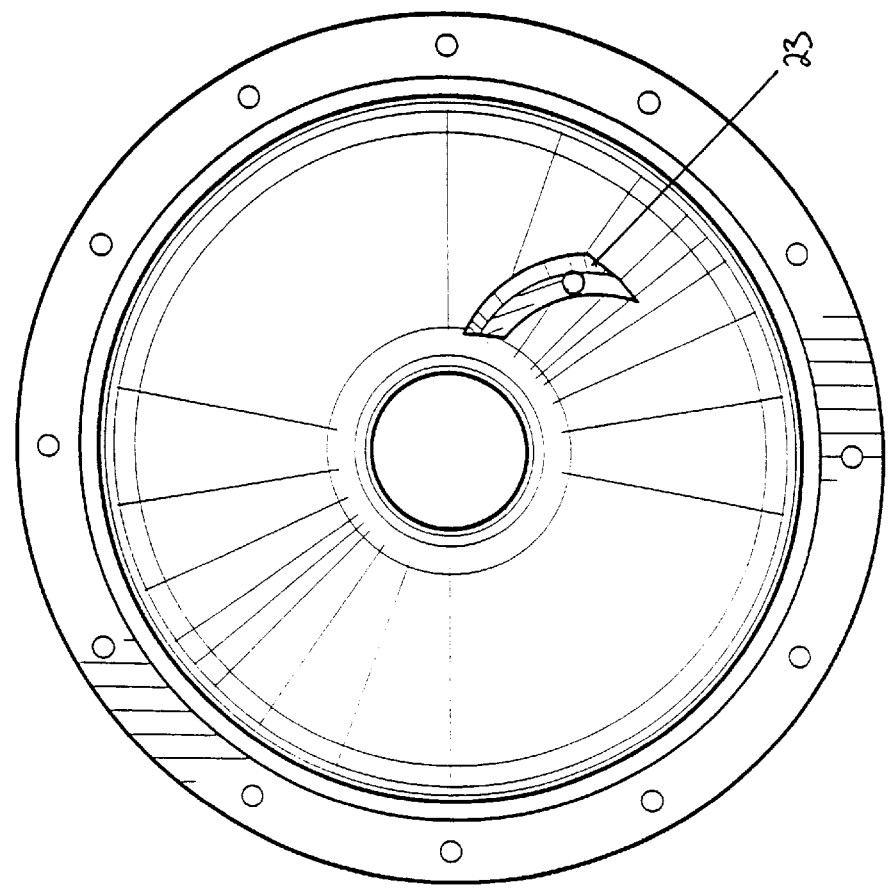
FIG. 3 shows both the bottom stator (left) and the bottom housing (right) of the pump. The figure on the left shows the view looking up at the pump when the bottom portion of the pump's housing is removed. The drawing on the right shows the view looking down at the bottom housing of the pump when it is removed.
Figure 3:
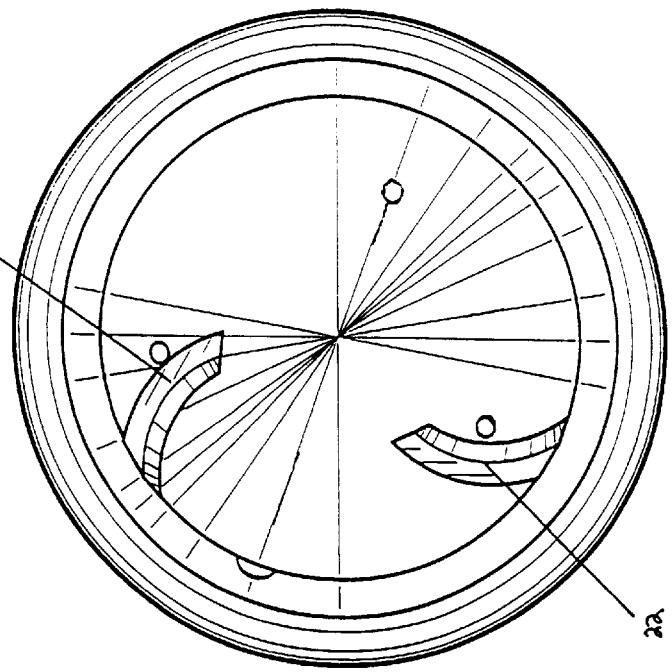
Figure 5:
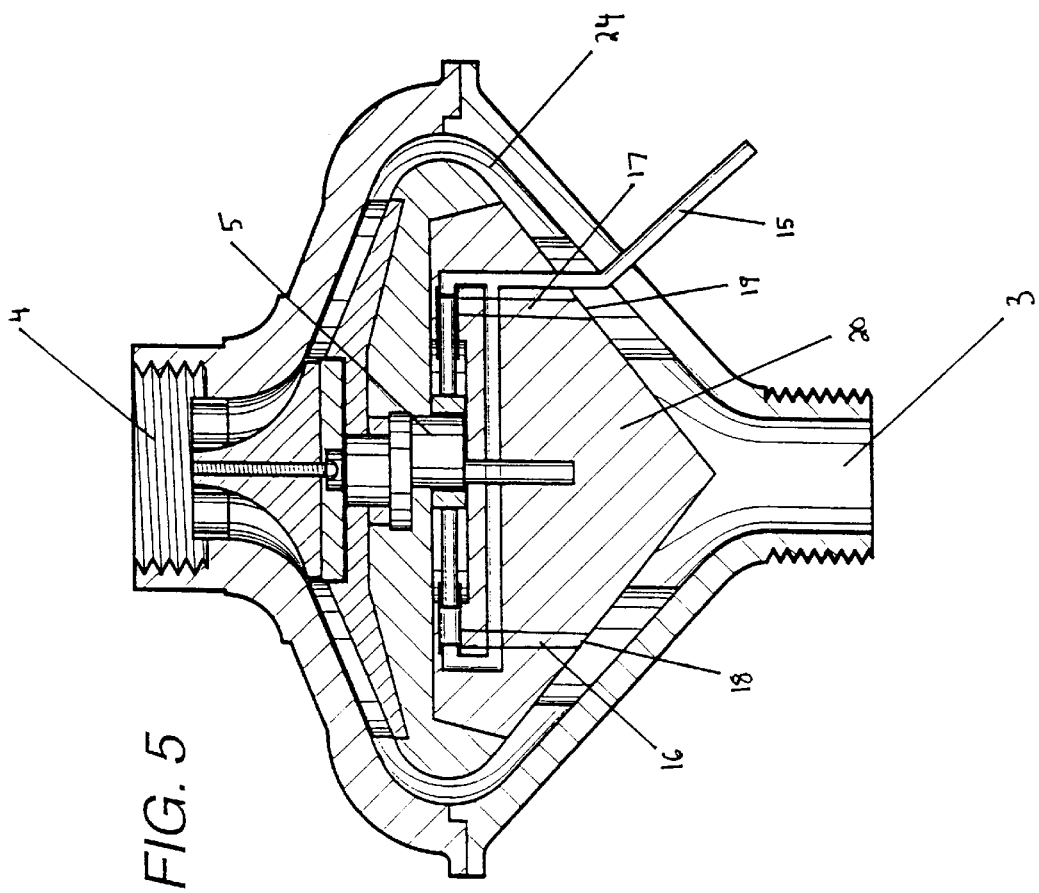
FIG. 5 is a cross-sectional view of FIG. 1 allowing a view of the internal parts of the pump.
Figure 4:
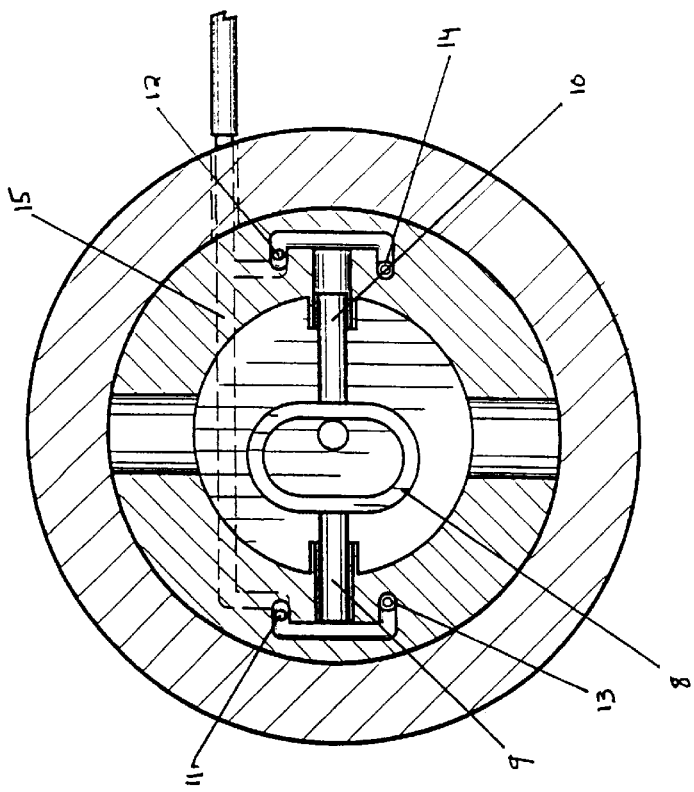
FIG. 4 is a cross-sectional overhead view of the piston arrangement.

In the preferred embodiment of this invention, water which enters the pump through a faucet is redirected (bent) by ten stator vanes located in the entry passage (4) in the top portion of the pump. The water is bent as it travels through the channels of the upper stator vanes and into the channels (7) of the thirteen turbine vanes (6) which rotate around the upper stator. The water then spills out into a channel (24) between the bottom stator and the housing for the pump which causes the water to cascade down the side of the bottom stator (20). The motion of the turbine vanes (6) cause a one cylinder (crank shaft) cam (5) to spin because said cam (5) is rotatably connected at the center of the rotating turbine vanes (6). The cam (5) is surrounded by an oval ring (8) which is connected to two pistons (9 and 10). The rotation of the cam (5) causes the oval ring (8) to move laterally and to cause the dual positive displacement pistons (9 and 10) to pump. This pumping action allows liquid fertilizer to be pulled through an inlet tube (15) and into one of the pistons (9 or 10). During each one-half (½) rotation of the cam (5), one piston's intake valve (11 or 12) will draw liquid fertilizer in while the other piston's exhaust valve (13 or 14) will discharge liquid fertilizer through a fertilizer exit tube (16 or 17).

Essentially piston 1 (9) will draw liquid fertilizer through the inlet tube (15) while piston 2 (10) ejects liquid fertilizer out exit tube 2 (17) as the cam makes a ½ rotation. As the cam finishes one complete rotation, piston 1(9) will force the liquid fertilizer which was drawn in during the first ½ rotation out exit tube 1 (16) while piston 2 (10) will draw liquid fertilizer through the inlet tube (15). Due to the presence of check valves (11 and 12), the fertilizer cannot retreat back into the inlet tube (15) when the pistons (9 and 10) churn and force fertilizer through the exit tubes (16 and 17). The liquid fertilizer exit tubes (16 and 17) empty into the bottom of the pump through holes (18 and 19) in the bottom stator (20) allowing the fertilizer to combine with the water which turned the turbine vanes (6) and also cascaded down the bottom stator (20). As both the liquid fertilizer and the water travel through to the bottom of the pump, they are redirected (straightened) by the angled vanes (21) on the bottom stator (20) and the angled vane (23) in the bottom housing (2). The mixture is then free to travel out of the exit passage (3) of the pump and into any connected device such as an attached hose.

A valve connecting the liquid fertilizer reservoir with the pump allows the free flow of the liquid fertilizer into the pump when the valve is open. When the valve is closed, the fertilizer will not be pulled into the pump and only water will flow through to the exit passage (3) at the bottom of the pump.

What is claimed is:

1. A positive displacement pump comprising:
   (a) a housing with an inlet port for a first liquid stream and an exit port for the first liquid stream,
   (b) a turbine with turbine vanes in fluid communication with the first liquid stream,
   (c) a cam rotatably connected to the turbine vanes,
   (d) a cam driven piston in fluid communication with an inlet tube and exit tube for a second liquid,
   (e) the inlet tube for drawing the second liquid from a reservoir into a chamber of the piston, and
   (f) the exit tube for dispersing the second liquid from the chamber of the piston into the exit port for the liquid stream.

2. The positive displacement pump of claim 1 further comprising an upper stator which is located under the inlet port for the first liquid stream to redirect the first liquid stream onto the turbine vanes.

3. The positive displacement pump of claim 1 further comprising a bottom stator which is located above the exit port to redirect the first liquid stream into the exit port.

4. The positive displacement pump of claim 1 further comprising a check valve connected to the inlet tube.

* * * * *